US011105395B2

(12) United States Patent
Mitrovic (10) Patent No.: US 11,105,395 B2
(45) Date of Patent: Aug. 31, 2021

(54) PLANETARY GEAR ASSEMBLY AND METHOD OF OPERATING SAME

(71) Applicant: PRATT & WHITNEY CANADA CORP., Longueuil (CA)

(72) Inventor: Lazar Mitrovic, Longueuil (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 14 days.

(21) Appl. No.: 16/682,596

(22) Filed: Nov. 13, 2019

(65) Prior Publication Data

US 2021/0123507 A1 Apr. 29, 2021

Related U.S. Application Data

(60) Provisional application No. 62/924,752, filed on Oct. 23, 2019.

(51) Int. Cl.
| F16H 1/28 | (2006.01) |
| F02C 7/36 | (2006.01) |
| F16H 57/08 | (2006.01) |
| F16H 35/06 | (2006.01) |
| F16H 35/10 | (2006.01) |

(52) U.S. Cl.
CPC ............... *F16H 1/28* (2013.01); *F02C 7/36* (2013.01); *F16H 35/06* (2013.01); *F16H 35/10* (2013.01); *F16H 57/082* (2013.01)

(58) Field of Classification Search
None
See application file for complete search history.

(56) References Cited

U.S. PATENT DOCUMENTS

| 2,749,778 A * | 6/1956 | Kuhn ............... F16H 1/2809 475/347 |
| 4,680,979 A | 7/1987 | Morishita et al. |
| 4,901,602 A | 2/1990 | Matoba |
| 5,466,198 A * | 11/1995 | McKibbin ............... F02C 7/36 475/346 |
| 6,964,155 B2 * | 11/2005 | McCune ............... F02C 7/36 384/297 |
| 6,994,651 B2 * | 2/2006 | Fox ............... F16C 33/605 475/335 |
| 7,011,599 B2 * | 3/2006 | Becquerelle ......... F16H 1/2827 475/331 |
| 8,172,717 B2 * | 5/2012 | Lopez ............... F16H 57/082 475/346 |
| 8,313,412 B2 * | 11/2012 | Montestruc ......... F16H 1/2836 475/346 |
| 8,758,190 B2 * | 6/2014 | Montestruc ......... F16H 1/2836 475/346 |
| 8,777,802 B2 * | 7/2014 | Emo ............... F16H 57/082 475/346 |

(Continued)

*Primary Examiner* — Dirk Wright
(74) *Attorney, Agent, or Firm* — Norton Rose Fulbright Canada (57) ABSTRACT

A carrier assembly for a planetary gear assembly includes a planet frame defining a central aperture therethrough, the central aperture defining a rotation axis, the planet frame configured to rotatably support a plurality of planet gears, and a carrier connected to the planet frame via a stud. At least one of a portion of the carrier proximate the stud and a portion of the stud between the carrier and the planet frame has a dimension reduction, such as a thickness reduction, therein.

17 Claims, 4 Drawing Sheets

(56) References Cited

U.S. PATENT DOCUMENTS

| | | | | |
|---|---|---|---|---|
| 8,920,284 B2* | 12/2014 | Fox | .................. | F16C 43/04 |
| | | | | 475/348 |
| 8,986,160 B2* | 3/2015 | Altamura | .............. | F16H 1/2836 |
| | | | | 475/347 |
| 9,145,967 B2* | 9/2015 | Fox | .................. | F16H 1/2836 |
| 10,006,520 B2* | 6/2018 | Ligata | ................. | F16H 57/0471 |
| 10,605,351 B2* | 3/2020 | Sheridan | ............. | F16H 57/0421 |
| 10,801,609 B2* | 10/2020 | Lemoine | ................. | B23P 19/04 |

* cited by examiner

PLANETARY GEAR ASSEMBLY AND METHOD OF OPERATING SAME

CROSS-REFERENCE

The present application claims the benefit of priority to U.S. Patent Application 62/924,752, filed Oct. 23, 2019, entitled "PLANETARY GEAR ASSEMBLY AND METHOD OF OPERATING SAME", which is hereby expressly incorporated by reference herein in its entirety.

TECHNICAL FIELD

The application relates to planetary gear systems.

BACKGROUND

In some applications, such as in aircraft engine gearboxes for example, existing planetary gear systems, sometimes also referred to as epicyclic geartrains, may have one or more drawbacks associated therewith. For example, in some aircraft engine applications, varying engine load conditions may result in misalignment of gears associated with a planetary gear system that transfers at least some of that load. Such misalignment may affect bearing and/or gear and/or planetary gear system life. Thus, improvements to prior art planetary gear systems are desirable.

SUMMARY

There is accordingly provided a carrier assembly for a planetary gear assembly, comprising: a planet frame defining a central aperture therethrough, the central aperture defining a rotation axis, the planet frame configured to rotatably support a plurality of planet gears; and a carrier connected to the planet frame via one or more studs extending from the carrier, at least one of a portion of the carrier proximate the studs and a portion of the studs between the carrier and the planet frame having a thickness reduction therein, the thickness reduction being in a direction substantially transverse to a major dimension of the studs.

In one aspect, there is provided a carrier assembly for a planetary gear assembly, comprising: a planet frame defining a central aperture therethrough, the central aperture defining a rotation axis, the planet frame configured to rotatably support a plurality of planet gears; and a carrier connected to the planet frame via a stud, at least one of a portion of the carrier proximate the stud and a portion of the stud between the carrier and the planet frame having a dimension reduction therein.

In some embodiments, the stud is a plurality of studs.

In some embodiments, the dimension reduction permits relative pivoting motion between the planet frame and the carrier about the rotation axis, the relative motion including elastic deformation of the at least one of the portions.

In some embodiments, the dimension reduction is dimensioned such that when a torque is applied to the carrier about the rotation axis, the torque elastically deforms the at least one of the portions while causing substantially no deformation to the planet frame.

In some embodiments, a material of the at least one of the portions is selected relative to a material of the planet frame to permit relative pivoting motion between the planet frame and the carrier about the rotation axis while maintaining the planet frame substantially undeformed.

In some embodiments, the dimension reduction is present in both of the portions, the dimension reduction in the portion of the stud is a diameter reduction, and the dimension reduction in the portion of the carrier is a thickness reduction.

In some embodiments, the stud is mateably received in an aperture defined in the planet frame.

In some embodiments, the carrier defines an aperture therethrough, the aperture being disposed radially inward of the stud.

In some embodiments, the carrier defines a rim circumscribing a portion of the aperture.

In another aspect, there is provided a planetary gear assembly, comprising: a sun gear rotatable about a rotation axis; a plurality of planet gears meshed to the sun gear; a ring gear disposed radially outward of the planet gears and meshed to the planet gears; and a carrier assembly, including: a plurality of planet gears connected to a planet frame, the planet gears mounted for rotation about respective rotation axes relative to the planet frame, and a carrier connected to the planet frame via a stud that prevents rotation of the carrier relative to the planet frame, the carrier being pivotable relative to the planet frame about the rotation axis via elastic deformation of at least one of a portion of the carrier proximate the stud and a portion of the stud that is disposed between the carrier and the planet frame.

In some embodiments, the carrier is pivotable relative to the planet frame about the rotation axis via elastic deformation of the at least one of the portions while a portion of the planet frame engaging the stud remains substantially undeformed.

In some embodiments, the stud is a plurality of studs distributed in a circumferential array coaxial with the rotation axis.

In some embodiments, the stud is mateably received in an aperture defined in the planet frame.

In some embodiments, the at least one of the portions has a dimension reduction therein.

In another aspect, there is provided an aircraft gearbox having an input and an output, and comprising the planetary gear assembly as described in any one of the above embodiments. In such embodiments, the carrier is one of the input and the output, the sun gear is the other one of the input and the output, and the planet gear is stationary relative to a rest of the aircraft gearbox.

In another aspect, there is provided a method of operating a planetary gear assembly, comprising: applying torque to one of a carrier and a sun gear operatively connected to the carrier via a plurality of planet gears rotatably supported on a planet frame connected to the carrier, to drive the other one of the carrier and the sun gear about a rotation axis that is common to the carrier and the sun gear; and in response to the torque, elastically deforming at least a part of the carrier to pivot the carrier relative to the planet frame about the rotation axis.

In some embodiments, the method includes maintaining the planet frame substantially undeformed during the step of deforming at least the part of the carrier.

In some embodiments, the step of deforming at least the part of the carrier includes elastically deforming a stud connecting the carrier to the planet frame.

In some embodiments, the step of elastically deforming the stud includes elastically deforming a portion of the stud that is disposed between the carrier and the planet frame.

In some embodiments, the step of deforming at least the part of the carrier includes elastically deforming a portion of the carrier that is both proximate to and connected to the stud.

BRIEF DESCRIPTION OF THE DRAWINGS

Reference is now made to the accompanying figures in which.

DETAILED DESCRIPTION

The present technology is illustrated with respect to an engine 10 for an aircraft. In the embodiment shown in FIG. 1, the aircraft engine 10 is a turboprop gas turbine engine. While the present technology may provide advantages in at least some applications in the typical pulsating torque operation of turboprop engines, it is contemplated that the present technology can be applied to and may provide advantages when used with other types of engines, and other types of applications other than engines. As an example, in some applications, the present planetary gear assembly technology may allow for weight savings relative to at least some prior art planetary gear assemblies for the same applications.

Figure 1:
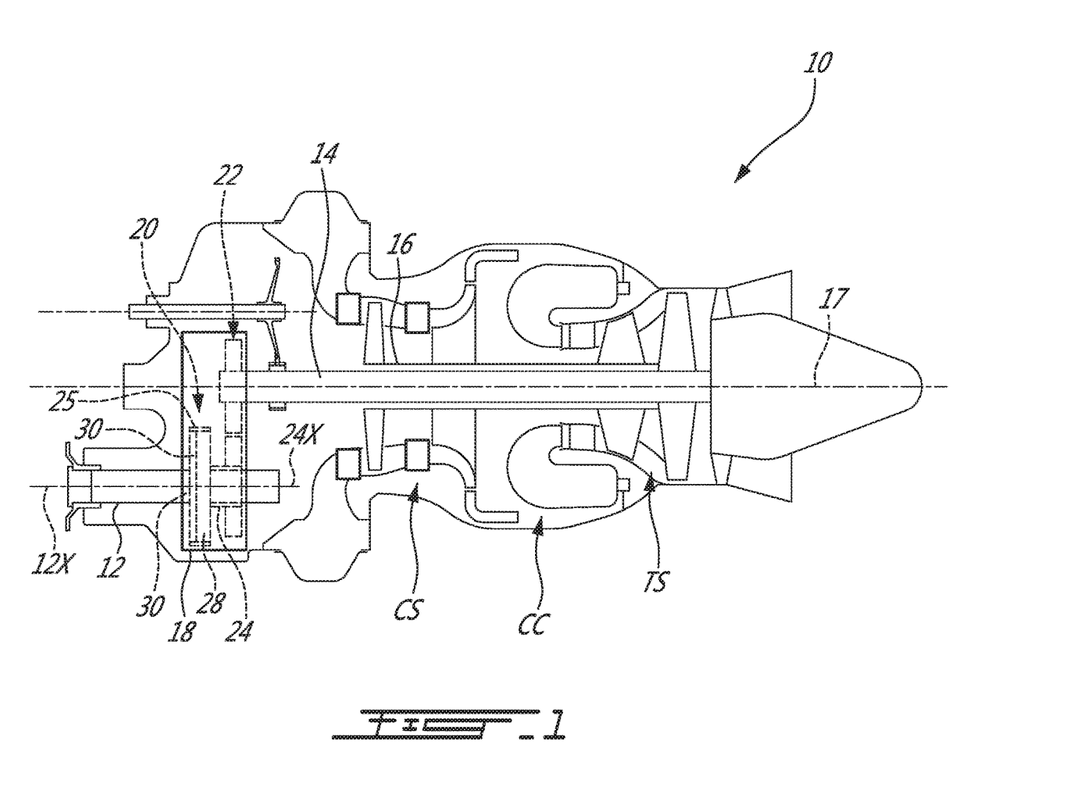
FIG. 1 is a schematic showing an aeronautical turboshaft engine having a gearbox.

In the present non-limiting embodiment, the engine 10 comprises an output shaft 12 rotatable about a rotation axis 12X for driving a rotor, such as a rotor of the aircraft for example, a low pressure shaft 14, and a high pressure shaft 16 rotatable about a common rotation axis 17. The engine 10 further comprises in serial flow communication a compressor section (CS) for pressurizing ambient air, a combustion chamber (CC) in which the compressed air is mixed with fuel and ignited for generating combustion gases, and a turbine section (TS) for extracting energy from the combustion gases. The compressor section (CS) and the turbine section (TS) are rotatable about the common rotation axis 17. The shafts 14, 16, and the compressor section (CS) and the turbine section (TS) may be implemented using any suitable technology, such as conventional technology for example. These components are therefore not described herein in detail.

Still referring to FIG. 1, the output shaft 12 is operatively connected to the low pressure shaft 14 via a gearbox 18 comprising a planetary gear assembly 20 and a gear train 22 connecting an input 20A of the planetary gear assembly 20 to the low pressure shaft 14. In this embodiment, an output 20B of the planetary gear assembly 20 is connected to the output shaft 12. The gear train 22 may be any suitable gear train, and may include for example offset, spur and/or helical gears in suitable numbers, sizes and configurations to operatively connect the low pressure shaft 14 to the input 20A in a way suitable for the particular application(s) of the gearbox 18. The gear train 22 is therefore not described herein in detail. In other embodiments and/or applications, other part(s) of the planetary gear assembly 20 may be used for torque input and/or other part(s) of the planetary gear assembly 20 may be used for torque output.

Figure 2:
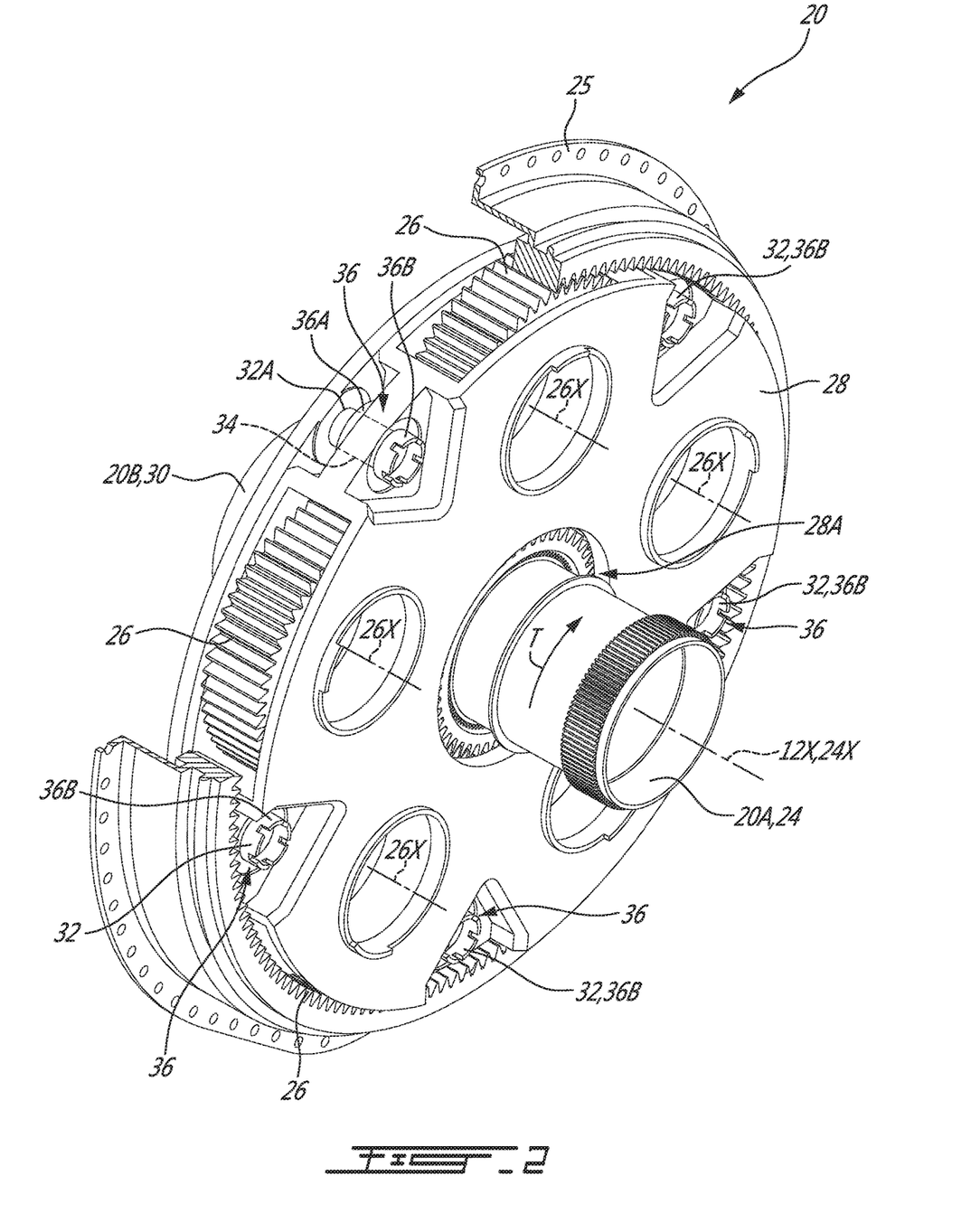
FIG. 2 is a perspective view of a planetary gear assembly used in the gearbox of FIG. 1.

Now referring to FIG. 2, the planetary gear assembly 20 includes a sun gear 24 rotatable about a rotation axis 24X. In the present non-limiting application of the planetary gear assembly 20, the rotation axis 24X of the sun gear 24 is collinear with the rotation axis 12X of the low pressure shaft 14. The planetary gear assembly 20 further includes a plurality of planet gears 26 meshed to the sun gear 24, as shown schematically in FIG. 2 with dashed lines, and to a ring gear 25. In the present embodiment, there are five planet gears 26, but any other number to suit each particular embodiment and application of the planetary gear assembly 20 may be used. In the present embodiment, and although not necessarily the case in other embodiments, the planet gears 26 are arranged in a circumferential array coaxial with the rotation axis 24X.

The planet gears 26 are carried, or in other words rotatably supported, by a planet frame 28 about respective rotation axes 26X. The planet frame 28 in this embodiment is disposed radially inward of the ring gear 25. The planet frame 28 defines a central aperture 28A therethrough, which receives therein the sun gear 24. The central aperture 28A defines the rotation axis 24X of the planet frame 28, which is the rotation axis 24X of the sun gear 24. Any suitable rotatable connection(s) between the planet gears 26 and the planet frame 28 may be used, and therefore these details are not described herein in detail.

A carrier 30 is connected to the planet frame 28 via connecting elements 31 including, in the depicted embodiment, a plurality of studs 32 that secure the carrier 30 relative to the planet frame 28 while permitting pivoting (P) (shown in FIG. 4) of the carrier 30 relative to the planet frame 28 about the rotation axis 24X. Each of the studs 32 extends from the carrier 30 and is made integral to the carrier 30 at the base of the stud 32 (i.e. the studs 32 are integrally formed with the carrier 30), and is at an outer end thereof mateably received in a corresponding aperture 34 (only one of which is labeled in FIG. 2 to maintain clarity) defined in the planet frame 28. In this embodiment, the number of studs 32 equals the number of planet gears 26. In other embodiments, other stud-to-planet-gear ratios, and hence other numbers of studs, may be used. In other embodiments, one or more of the studs 32 may be integral to the planet frame 28 and/or both the planet frame 28 and the carrier 30, and/or need not be integral to either of the planet frame 28 and the carrier 30. The studs 32 define a major dimension extending along their length, away from the carrier 30. This may be defined, for example, relative to a central axis extending through the center of the body of each of the studs 32.

In the present embodiment, the studs 32 are received through corresponding apertures 34 in the planet frame 28 and thereby rotationally lock (i.e. prevent rotation) the planet frame 28 relative to the studs 32. In this embodiment, the studs 32 include respective flanges 36A that abut the planet frame 28 on the side facing toward the carrier 30 and thereby position the planet frame 28 relative to a length of the studs 32. Nuts 36B are threaded and tightened onto respective outer ends of the studs 32 and thereby secures the planet frame 28 to the studs 32 and to the carrier 30.

In some embodiments, one or more of the flanges 36A may be omitted and instead other spacing/positioning features, such as for example one or more elements sandwiched between the planet frame 28 and the carrier 30 for example, may be used to position/space the planet frame 28 relative to the studs 32 and/or the carrier 30. In other embodiments, one or more different stud arrangements may be used to secure the planet frame 28 to the carrier 30, such as for example snap-fit connections. In some such embodiments, one or more of the studs 32 may have other shapes.

Figure 3A:
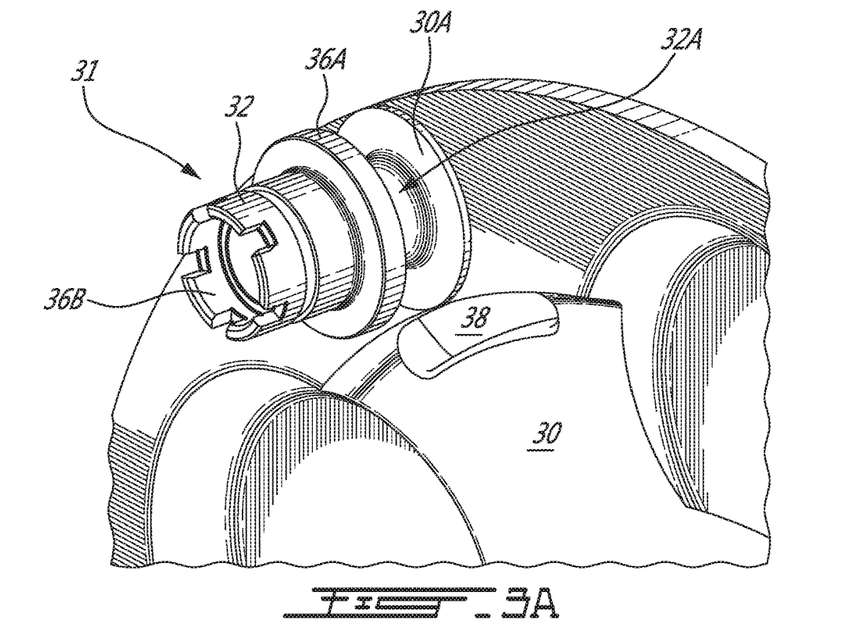
FIG. 3A is a perspective view of a stud and a base of a carrier of the planetary gear assembly of FIG. 2.
Figure 3B:
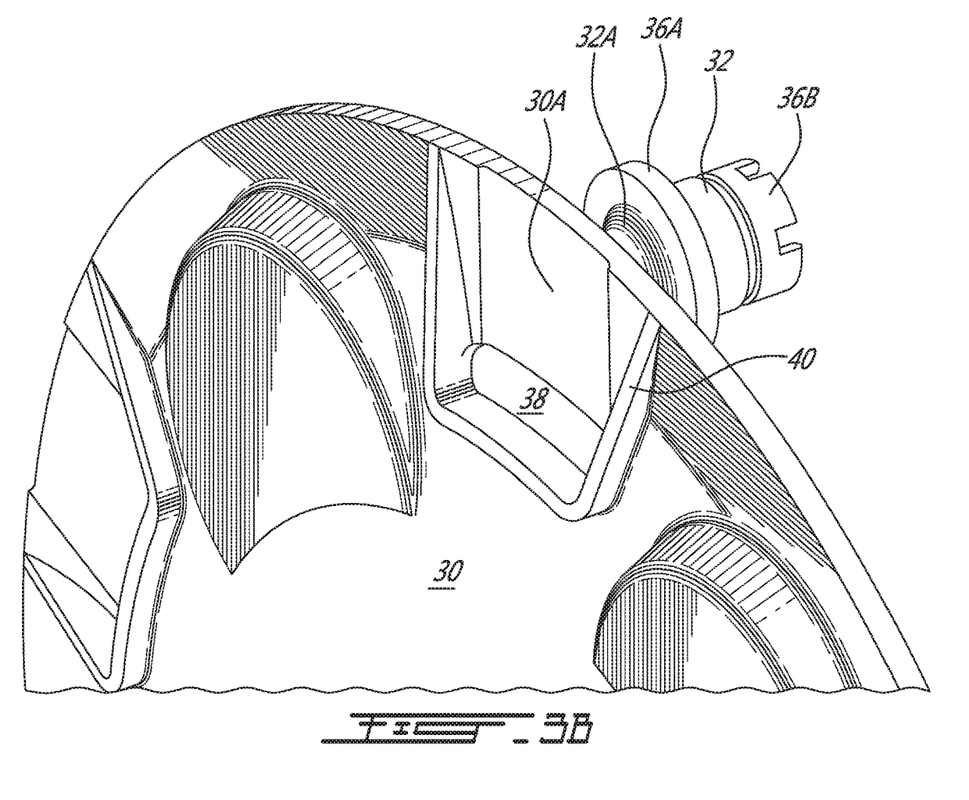
FIG. 3B is another perspective view of the stud and the base of the carrier of the planetary gear assembly of FIG. 2.

Referring now to FIGS. 3A and 3B, each stud 32 in this embodiment includes a portion 32A disposed between the carrier 30 and the planet frame 28, and in this embodiment between the carrier 30 and the flange 36A. The portion 32A has a dimension reduction therein, which is provided by a reduction in a diameter of the portion 32A. In other embodiments the dimension reduction may be provided for example by a thickness reduction (for example in embodiments in which one or more of the portions 32A and/or the studs 32 may have a rectangular cross-section), one or more notches, grooves, and/or other features that increase an elastic flexion limit of the portion 32A relative to a rest of the stud 32.

The term "dimension reduction" as used herein is therefore understood to be a thickness reduction of the element in question, in a direction substantially transverse to a longitudinal axis of the element extending along its longest dimension, regardless of the cross-sectional shape of the element. Accordingly, the term "thickness reduction" may be used to include all such transverse narrowing having a smaller dimension (e.g. in thickness, diameter, etc.) relative to the remainder of the element in question. The thickness reduction is therefore defined in a direction substantially transverse to a major dimension of the stud (e.g. along a longitudinal axis extending through the center of the body of the stud), as defined above.

In some embodiments, the portion 32A may be made more elastically flexible than a rest of the stud 32 and the planet frame 28 by being made from a material that is more flexible than the material from which the rest of the stud 32 and the planet frame 28 is made. In some such embodiments, one or more of the possible elastic-flexing-increasing features described above may be present in the portion 32A. In other such embodiments, the elastic-flexing-increasing features described above may be omitted from the stud 32.

Referring to FIG. 3B, a portion 30A of the carrier 30 proximate each stud 32 also includes a dimension reduction therein, which is provided by a reduction in a thickness of the portion 30A of the carrier 30. In other embodiments the dimension reduction may be provided for example one or more notches, grooves, and/or other features that increase an elastic flexion limit of the portion 30A relative to a rest of the carrier 30. As an example, the carrier 30 defines therein, and in this embodiment therethrough, an aperture 38 radially inward of each corresponding portion 30A.

Hence in this embodiment, each aperture 38 of the apertures 38 is disposed radially inward of the stud 32 corresponding to that aperture 38. In an aspect, the aperture 38 may be an elastic-flexing-increasing feature that helps increase elastic flexion of the corresponding portion 30A of the carrier 30. In some embodiments one or more of the apertures 38 may be omitted.

As another example, in some embodiments, the portion 30A may be made more elastically flexible than a rest of the carrier 30 and/or the stud 32, and more elastically flexible than the planet frame 28, by being made from a material that is more flexible than the material from which the rest of carrier 30 and/or the stud 32, and the planet frame 28, respectively, are made. In some such embodiments, one or more of the possible elastic-flexing-increasing features described above may be present in the portion 30A. In other such embodiments, the elastic-flexing-increasing features described above may be omitted from the portion 30A.

Hence, more generally, the elastic-flexing-increasing feature(s) and/or the material(s) of the portions 30A and 32A are selected relative to the material and construction of the planet frame 28, such that when a torque is applied to the carrier 30 about the rotation axis, the torque elastically deforms the portions 30A of the carrier 30 and/or the portions 32A of the studs 32 while causing substantially no deformation to the planet frame 28. Stated more broadly, at least the portions of the planet frame 28 that engage the studs remain substantially undeformed. In some embodiments, an entirety of the planet frame 28 may remain substantially undeformed. As used herein, the terms "substantially undeformed"/"substantially no deformation" include embodiments in which no deformation of the planet frame 28 results.

Figure 4:
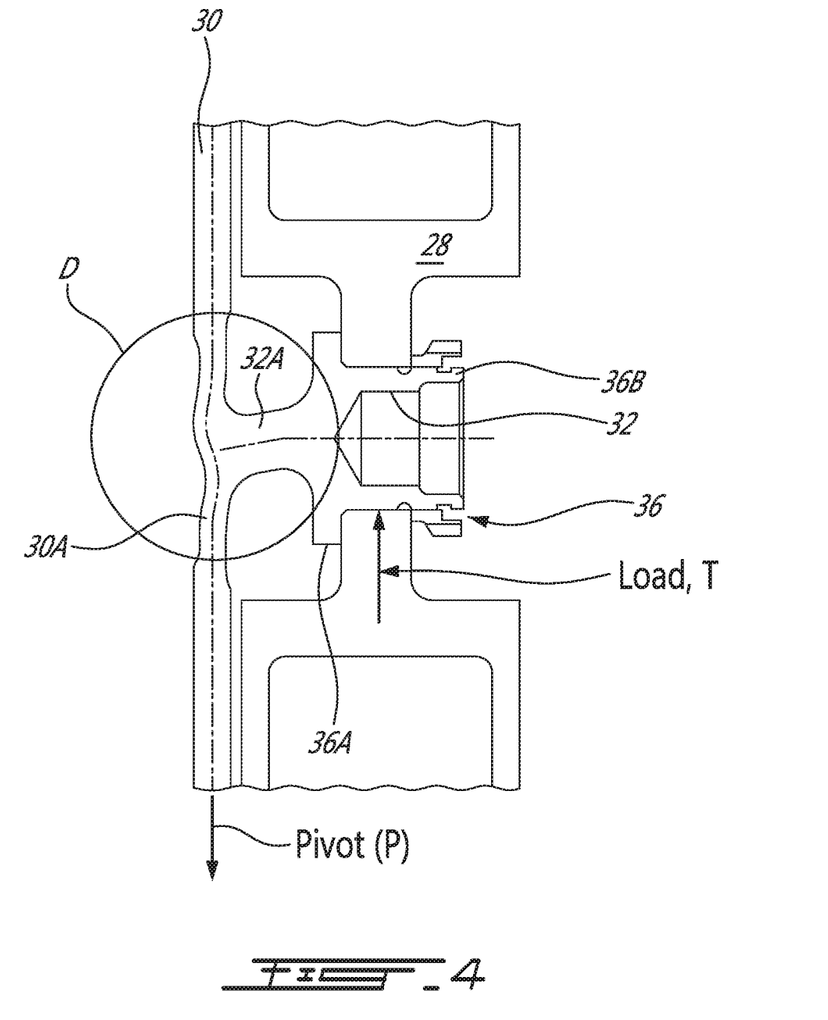
FIG. 4 is a schematic section view taken through the planetary gear assembly of FIG. 2 along a plane passing through a center axis of the stud of FIGS. 3A and 3B.

Accordingly, in use, in response to the torque, the carrier 30 may pivot relative to the planet frame 28 about the rotation axis 24X of the sun gear 24 via elastic flexion of the studs 32 and/or the portions 30A of the carrier 30 while the planet frame 28 remains substantially undeformed. The pivoting and elastic flexion are shown in FIG. 4 in an exaggerated manner for clarity. In different embodiments and applications the magnitude of the pivoting may be different.

For example, in the present applications the pivoting of the carrier 30 relative to the planet frame 28 may be a fraction of a degree about the rotation axis 24X relative to an at rest position (FIG. 2) of the carrier 30. In other embodiments and depending on the application, the magnitude may be different. In an aspect, the pivoting and/or elastic flexion may absorb at least some impulses or other forces that may be imparted for example to the carrier 30 during use and may thereby help maintain alignment of the planet frame 28, the sun gear 24, the planet gears 26, and the ring gear 25.

Any suitable combination of elastic-flexing-increasing features as described above and/or materials and/or manufacturing methods may be used to provide for this functionality. For example, in some alternative embodiments, the elastically flexible portion 30A of the carrier 30 may be made as resistant to elastic flexion, or more resistant to elastic flexion, than the planet frame 28. In some such embodiments, the portion 30A thus may have no elastic-flexing-increasing features and no particular material or construction selection as described above.

While the embodiments described above may provide advantages in some applications, in other embodiments, combinations of the elastic flexion features and materials selections described above may be selected such that some elastic flexion may occur in the planet frame 28 during pivoting of the carrier 30 relative to the planet frame 28 about the rotation axis 24X via elastic flexion of the portions 30A and/or 32A of the carrier 30 and studs 32, with however a majority of the total elastic flexion occurring in the portion(s) 30A, 32A. Such alternative embodiments may still provide at least some advantages in some applications relative to prior art planetary gear systems in those applications.

Referring to FIG. 4, the carrier 30 further defines rim 40, with each rim 40 circumscribing at least a portion of a corresponding aperture 38 and a corresponding portion 30A of the carrier 30. In an aspect, the rim 40 may help confine elastic flexion in the carrier 30 to the portions 30A. While the rims 40 may provide one or more advantages in some applications, one or more of the rims 40 may be omitted.

Referring to FIGS. 2 and 4, the present technology provides a method of operating a planetary gear assembly, such as the planetary gear assembly 20. The method may include applying torque to one of a carrier 30 and a sun gear 24 operatively connected to the carrier 30 via a plurality of planet gears 26 rotatably supported on a planet frame 28 connected to the carrier 30. This step may be executed to drive the other one of the carrier 30 and the sun gear 24 about a rotation axis 24X that is common to the carrier 30 and the sun gear 24. In the engine 10 application of the planetary gear assembly 20 shown in FIG. 1, where the sun gear 24 is used as the input 20A of the planetary gear assembly 20, and as shown with arrow (T), the torque may be applied to the sun gear 24, to drive the carrier 30 which in turn may drive the output shaft 12 of the aircraft engine 10.

As shown in FIG. 4, the torque (T) may be transmitted to the planet frame 28 via the ring gear 25 and the planet gears 26. In some cases, the torque (T) may be applied in one or more pulses, which may for example occur due to various operating conditions of the engine 10. As shown in FIG. 4 with reference letter (D), the elastic flexion feature(s) described above may allow at least some such impulses of the torque (T) may elastically deform/flex the studs 32 and/or the portions 30A of the carrier 30 engaging the studs 32. The method may thus include, in response to the torque (T), elastically pivoting (P) the carrier 30 relative to the planet frame 28 about the rotation axis 24X.

The pivoting/absorption may allow to avoid or to at least reduce any elastic flexion in the planet frame 28. Accordingly, the method may include maintaining the planet frame 28 substantially undeformed during the step of elastically pivoting (P) the carrier 30 relative to the planet frame 28. As seen above, in embodiments in which the studs 32 are configured to elastically flex before any flexion in the planet frame 28 occurs, the step of elastically pivoting the carrier 30 includes elastically deforming the studs 32 connecting the carrier 30 to the planet frame 28. Also as seen above, in embodiments Any suitable materials, construction and manufacturing methods could be used to construct the parts and systems to meet the description thereof above, and more particularly to suit each particular embodiment and application thereof, so long as the functionality and properties of the parts and systems are maintained as described. For example, the number and sizing of the gears of the planetary gear assembly 20 may be selected using conventional engineering principles to provide for functionality that may be required in a given application of the planetary gear assembly 20. The above description provides non-limiting examples of embodiments, and one skilled in the art will recognize that changes may be made to the embodiments described without departing from the scope of the technology disclosed.

For example, the planetary gear assembly described herein may be used in other types of engine, and/or in other applications which need not necessarily be in an engine. As another example, in some such other applications the sun gear of the planetary gear assembly may be used as an output of the planetary gear assembly with the carrier being used as an input of the planetary gear assembly.

As yet another example, in some embodiments, a greater or a fewer number of the studs 32 may be used to connect the carrier 30 to the planet frame 28. In some embodiments, it is contemplated that a single stud 32 may be used to connect the carrier 30 to the planet frame 28.

As yet another example, in some applications, the input 20A of the planetary gear assembly 20 may instead be used as the output and the output 20B as the input. Stated otherwise, in such applications, the carrier 30 may be the input 20A and the sun gear 24 may be the output 20B.

Yet other modifications are also possible without departing from the scope of the present technology.

The invention claimed is:

1. A carrier assembly for a planetary gear assembly, comprising:
a planet frame defining a central aperture therethrough, the central aperture defining a rotation axis, the planet frame configured to rotatably support a plurality of planet gears; and
a carrier connected to the planet frame via one or more studs extending from the carrier, a portion of the carrier proximate the studs and a portion of the studs between the carrier and the planet frame both having a thickness reduction therein, the thickness reduction of at least the portion of the studs being in a direction substantially transverse to a major dimension of the studs.

2. The carrier assembly of claim 1, wherein the thickness reduction is provided in the studs and defines a smaller diameter than a remainder of the studs along the major dimension thereof.

3. The carrier assembly of claim 1, wherein the thickness reduction permits relative pivoting motion between the planet frame and the carrier about the rotation axis, the relative motion including elastic deformation of the at least one of the portions.

4. The carrier assembly of claim 1, wherein the thickness reduction is dimensioned such that when a torque is applied to the carrier about the rotation axis, the torque elastically deforms the at least one of the portions while causing substantially no deformation to the planet frame.

5. The carrier assembly of claim 1, wherein a material of the at least one of the portions is selected relative to a material of the planet frame to permit relative pivoting motion between the planet frame and the carrier about the rotation axis while maintaining the planet frame substantially undeformed.

6. The carrier assembly of claim 1, wherein the stud is mateably received in an aperture defined in the planet frame.

7. The carrier assembly of claim 1, wherein the carrier defines an elastic-flexing-increasing aperture therethrough, the elastic-flexing-increasing aperture being disposed radially inward of the stud.

8. The carrier assembly of claim 7, wherein the carrier defines a rim circumscribing a portion of the elastic-flexing-increasing aperture.

9. A planetary gear assembly, comprising:
a sun gear rotatable about a rotation axis;
a plurality of planet gears meshed to the sun gear;
a ring gear disposed radially outward of the planet gears and meshed to the planet gears; and
a carrier assembly, including:
a plurality of planet gears connected to a planet frame, the planet gears mounted for rotation about respective rotation axes relative to the planet frame, and
a carrier connected to the planet frame via a stud that secures the carrier to the planet frame such that the carrier is pivotable relative to the planet frame about the rotation axis via elastic deformation of both portion of the carrier proximate the stud and a portion of the stud that is disposed between the carrier and the planet frame.

10. The planetary gear assembly of claim 9, wherein the carrier is pivotable relative to the planet frame about the rotation axis via elastic deformation of the portions while a portion of the planet frame engaging the stud remains substantially undeformed.

11. The planetary gear assembly of claim 10, wherein the stud is a plurality of studs distributed in a circumferential array coaxial with the rotation axis.

12. The planetary gear assembly of claim 9, wherein the stud is mateably received in an aperture defined in the planet frame.

13. The planetary gear assembly of claim 9, wherein the portions have a dimension reduction therein.

14. An aircraft gearbox comprising the planetary gear assembly of claim 9.

15. A method of operating a planetary gear assembly, comprising:

applying torque to one of a carrier and a sun gear operatively connected to the carrier via a plurality of planet gears rotatably supported on a planet frame connected to the carrier by a stud, to drive the other one of the carrier and the sun gear about a rotation axis that is common to the carrier and the sun gear; and in response to the torque, elastically deforming the stud connecting the carrier to the planet frame and elastically deforming a portion of the carrier that is proximate to and connected to the stud, to pivot the carrier relative to the planet frame about the rotation axis.

16. The method of claim 15, comprising maintaining the planet frame substantially undeformed during the step of elastically deforming the portion of the carrier.

17. The method of claim 15, wherein the step of elastically deforming the stud includes elastically deforming a portion of the stud that is disposed between the carrier and the planet frame.

* * * * *